Figure 1:
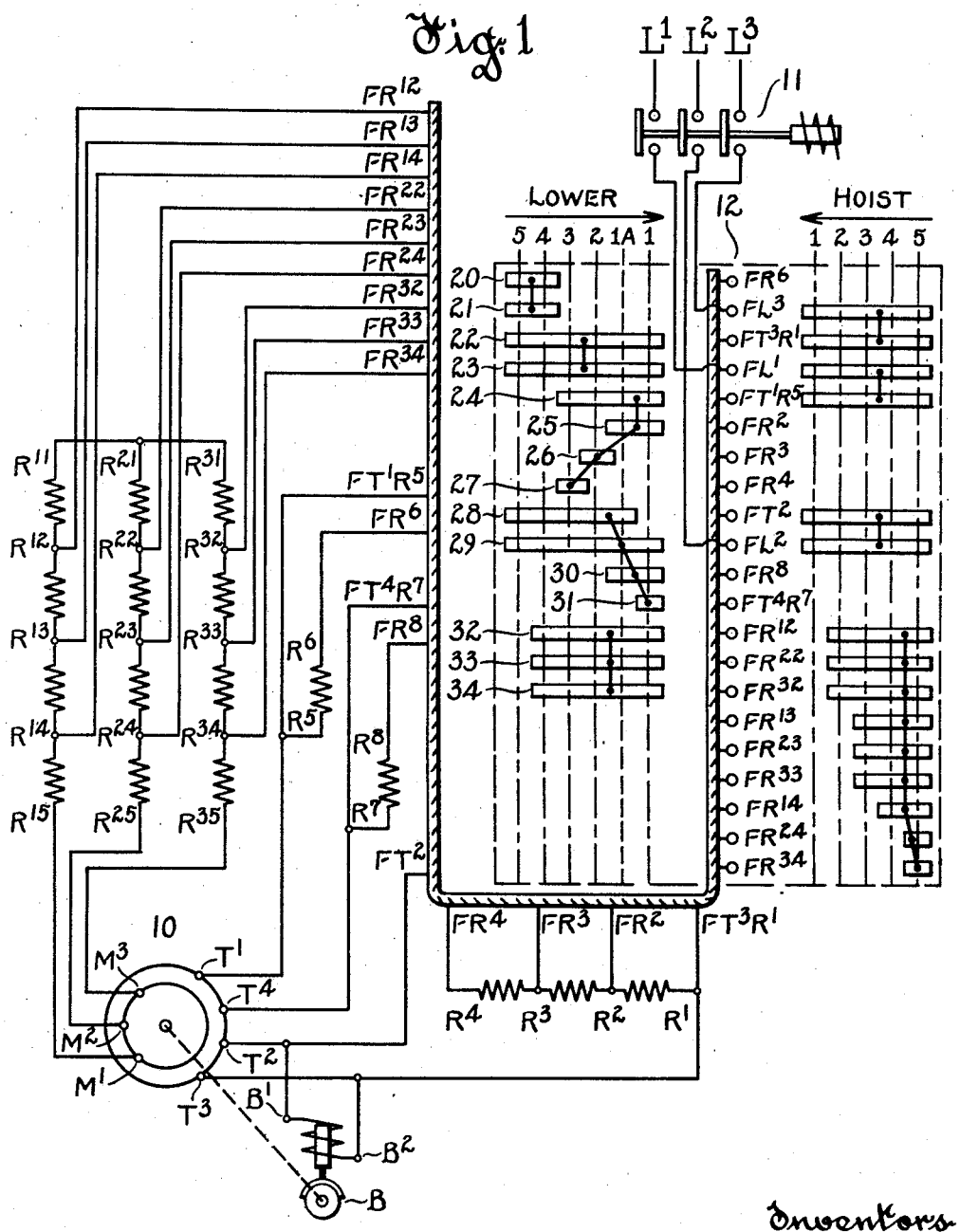

Dec. 14, 1948.  E. W. SEEGER ET AL  2,456,538
CONTROL FOR ALTERNATING CURRENT MOTORS
Filed Nov. 12, 1946  3 Sheets-Sheet 1

Inventors
Norbert L. Schmitz
Edwin W. Seeger
By Frank H. Hubbard
Attorney

Dec. 14, 1948.  E. W. SEEGER ET AL  2,456,538
CONTROL FOR ALTERNATING CURRENT MOTORS
Filed Nov. 12, 1946  3 Sheets-Sheet 2
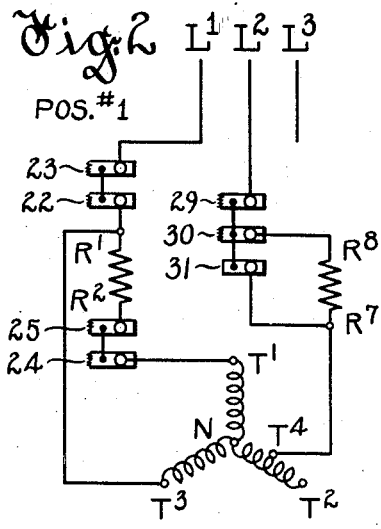
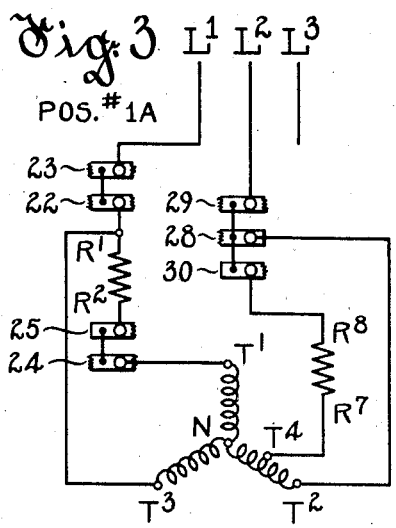
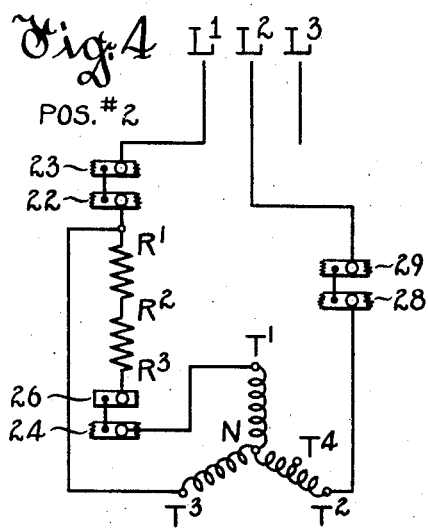
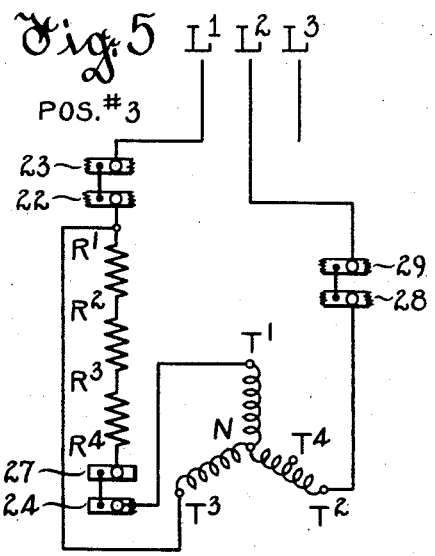
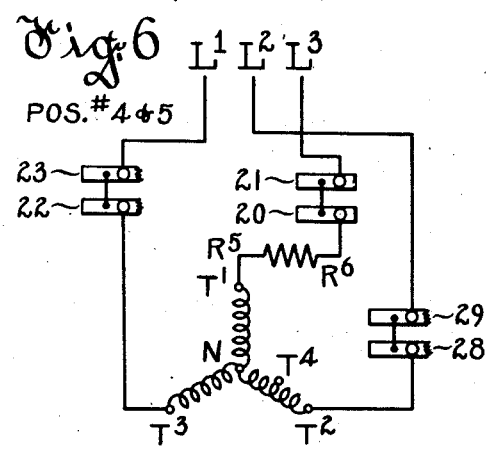

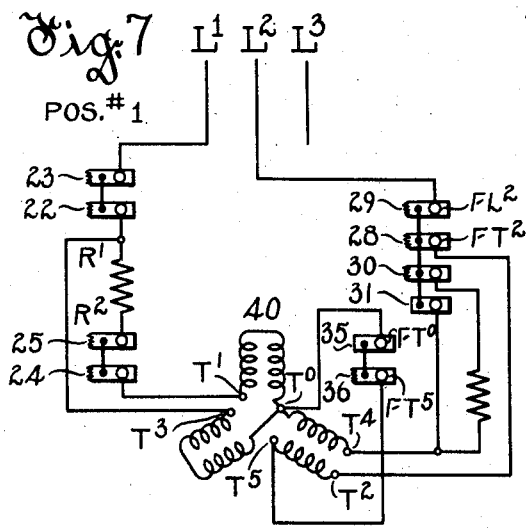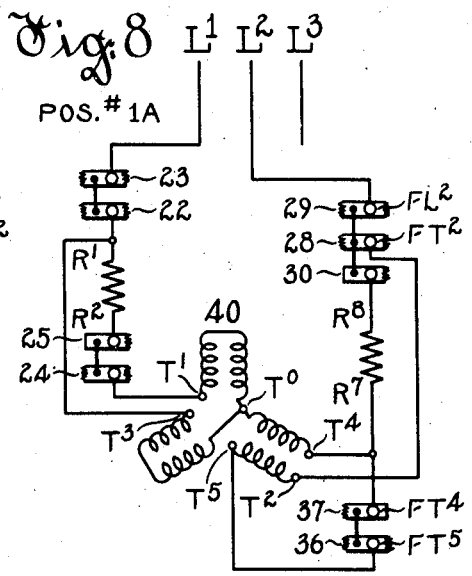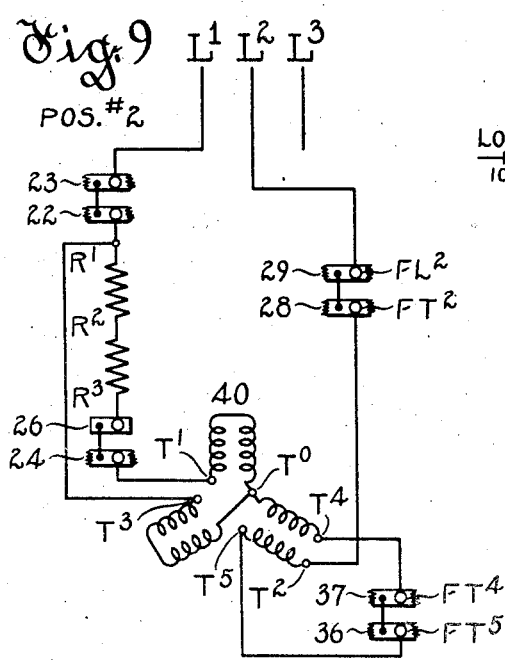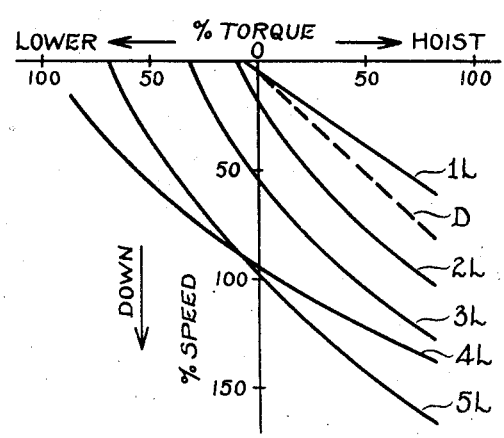

Patented Dec. 14, 1948

2,456,538

UNITED STATES PATENT OFFICE 2,456,538

CONTROL FOR ALTERNATING CURRENT MOTORS

Edwin W. Seeger, Wauwatosa, and Norbert L. Schmitz, Milwaukee, Wis., assignors to Cutler-Hammer, Inc., Milwaukee, Wis., a corporation of Delaware Application November 12, 1946, Serial No. 709,342

11 Claims. (Cl. 318—225)

1

This invention relates to a method of and means for controlling alternating current motors employed as in a hoist system to afford braking of overhauling loads.

Various systems have heretofore been proposed to obtain through use of autotransformers, impedances, etc. voltage unbalance of the motor primary with highly desirable speed torque characteristics for lowering control, and the present invention has among its objects to obtain comparable advantageous results through circuit commutation wtihin the controlled motor of certain of the coils of the primary.

Another object is to enable such results to be accomplished in different ways, as by tapping certain of the motor windings or by employing a standard multi voltage motor not requiring any additional terminals for its primary windings.

Another object is to provide for control which may be effected through the medium of either electromagnetic means or manual means, as for example a drum type controller.

Other objects and advantages of the invention will hereinafter appear.

The accompanying drawings illustrate certain embodiments of the invention which will now be described, it being understood that the embodiments illustrated are susceptible of various modifications without departing from the scope of the appended claims.

In the drawings,

Figure 1 is a diagrammatic showing of one embodiment of the invention utilizing a motor having a tapped primary winding;

Figs. 2 to 6, inclusive, are simplified diagrams of the motor primary connections established by the controller of Fig. 1 for lowering;

Figs. 7 to 9, inclusive, show diagrammatically a modified embodiment of the invention utilizing a dual voltage motor, this showing comprising diagrams of the motor primary connections to be established progressively, and Fig. 10 depicts the speed torque characteristics which are approximated by the control methods herein disclosed.

Primary winding tap method

One method of achieving the desired control involves use of a polyphase slip ring motor and tapping of one phase winding of the primary so that there will be an extra external connection or terminal for that particular phase winding to make it possible to alter the effective number of coil turns in that phase for particular lowering positions. One way of providing for such a tap

2 or terminal would be to wind the coils in the tapped phase in two sets insulated from one another and placed in the same slots of the primary winding core. One end of the first set preferably is connected to the common point of connection for all of the phase windings, and its other end connected to the extra terminal. One end of the second set would be connected to such extra terminal and its other end connected to the usual terminal for that phase. The first set then links the same magnetic circuit as the full winding, i. e., the two sets of coils in series, the number of turns of the full winding preferably being the same as that of a standard winding.

Referring to Fig. 1, the same illustrates diagrammatically such a slip ring motor 10 having a primary supplied from lines $L^1$, $L^2$, $L^3$, the primary having terminals $T^1$, $T^2$, $T^3$ and $T^4$. The secondary of the motor has terminals $M^1$, $M^2$ and $M^3$, and said secondary has for control thereof in a conventional manner series resistors for each phase, shown as resistors $R^{11}$ to $R^{15}$, $R^{21}$ to $R^{25}$, and $R^{31}$ to $R^{35}$. Also as is customary, the motor has associated therewith a mechanical brake B having a shunt winding, said winding having a terminal $B^1$ thereof connected to the motor terminal $T^2$ and having a terminal $B^2$ connected to the motor terminal $T^3$.

The connections between the primary of motor 10 and lines $L^1$, $L^2$ and $L^3$ includes a triple pole switch 11, preferably of the electromagnetic type, to be controlled in any preferred manner, and a drum controller 12, the latter controlling all connections between the motor and switch 11.

The drum controller 12 is of the conventional form, comprising two sets of contact segments and an intermediate set of contact fingers. As will be understood, when the segments stand in that relation to the contact fingers depicted in Fig. 1 the drum is in the off position from which it is movable in one direction to engage with certain of the fingers, the hoisting segments, or alternatively in a reverse direction to engage with certain of said fingers the lowering segments. The hoisting segments are arranged to accomplish hoisting control in a well known manner, and accordingly this portion of the control will not be described in detail. For simplicity of illustration Fig. 1 shows the circuit connections between the motor and the drum in cable form, but the reference characters employed enable all circuits to be readily traced. Each drum finger bears the reference character of line, motor or resistor terminal to which it is connected, supplemented by prefix F. Thus, for example, it will be understood that contact finger $FT^2$ has a direct connection with motor terminal $T^2$, whereas contact finger $FR^{12}$ has a direct connection with common point $R^{12}$ of the resistors $R^{11}$—$R^{12}$, and $R^{12}$—$R^{15}$.

The lowering segments of the drum comprise the interconnected segments 22 and 23 which engage and bridge contact finger $FT^3R^1$ and $FL^1$ in all lowering positions of the drum. A segment 29 engages contact finger $FL^2$ in all lowering positions of the drum and is interconnected with segments 28, 30 and 31. Segment 28 engages finger $FT^2$ in all lowering positions except the first. Segment 30 engages finger $FR^8$ only in the first lowering position and in the intermediate lowering position between the first and second lowering positions, while the segment 31 engages finger $FT^4R^7$ only in the first lowering position. Other interconnected segments 32, 33 and 34 engage their respective contact fingers $FR^{12}$, $FR^{22}$ and $FR^{32}$ in all lowering positions except in the fifth, while interconnected segments 20 and 21 engage their respective contact fingers $FR^6$ and $FL^3$ only in the fourth and fifth lowering positions.

The drum contact segments and fingers above described, with the exception of segments 32, 33 and 34 and their respective contact fingers, are provided for the control of the motor primary. This primary control involves varying the effective number of turns in one phase of the primary winding and effecting other circuit commutations making use of the primary resistors. The circuits for the three phases of the primary windings and the resistors above mentioned are shown in simplified form in Figs. 2 to 6.

Prior to considering the primary connections it is to be noted that in the first four lowering positions all secondary resistors except $R^{11}$—$R^{12}$, $R^{21}$—$R^{22}$ and $R^{31}$—$R^{32}$ are included in the circuit, the latter resistors being short-circuited by the bridging of contact fingers $FR^{12}$, $FR^{22}$ and $FR^{32}$ by the contact segments 32, 33 and 34. However, the resistors just mentioned are included in the motor secondary circuit in the fifth lowering position of the controller by disengagement of segments 32, 33 and 34 from their respective contact fingers.

Referring to Fig. 2, it shows the circuit connections for the motor primary as established in the first lowering position of the drum, assuming that the line switch 11 is closed. Considering these connections, the primary terminal $T^3$ is connected to line $L^1$ by engagement of the drum segments 22 and 23 with their respective contact fingers. Primary terminal $T^1$ is connected to line $L^1$ through engagement of drum segments 24 and 25 with their respective contact fingers, which completes circuit from terminal $T^1$ through resistor $R^1$—$R^2$ and thence through drum contacts 22 and 23 and their respective contact fingers to line $L^1$. Primary terminal $T^4$ is connected to line $L^2$ through drum segments 29 and 31 and their respective contact fingers, the resistor $R^7$—$R^8$ being connected between terminal $T^4$ and line $L^2$, but being short-circuited. By the above mentioned connections of terminal $T^4$ the effective number of coil turns in one phase of the primary is reduced to the number of turns embraced between N—$T^4$. Reducing the effective number of turns in one phase of the primary winding by the connection of terminal $T^4$ to line $L^2$ produces an increase in motor flux. The increase in flux thereby produces an increase in torque available at a given speed over the torque available at such given speed with all coil turns of that phase effective. The speed torque characteristic produced by the motor as described for the first lowering position is depicted by curve 1L of Fig. 10. If all the coil turns between N—$T^2$ were connected in the primary circuit for the first lowering position the speed torque characteristic would be as depicted by curve D of Fig. 10. Thus it can be seen that a greater braking action for a given speed is obtained by using only the coil turns embraced between N—$T^4$.

Referring to Fig. 3, it shows the motor primary connections established in the intermediate position between the first and second lowering positions, this change being effected by inserting resistor $R^7$—$R^8$ in series between line $L^2$ and terminal $T^4$ and by connecting terminal $T^2$ directly to line $L^2$. Terminal $T^2$ is connected to line $L^2$ through engagement of drum segment 28 with its contact finger $FT^2$. The resistor $R^7$—$R^8$ is placed in series with terminal $T^4$ by the disengagement of segment 31 from its contact finger and by the continued engagement of segment 30 with its contact finger. The connections established in the intermediate lowering position with resistor $R^7$—$R^8$ in series between line $L^2$ and motor terminal $T^4$ prevents a short-circuiting condition in the turns of the winding between the motor terminals $T^2$ and $T^4$.

Referring to Fig. 4, it shows the primary connections established with the drum in its second lowering position, the change effected being that of disconnecting terminal $T^4$ from line $L^2$, and of inclusion of a second step of resistance $R^2$—$R^3$ between motor terminal $T^1$ and line $L^2$. Resistor $R^2$—$R^3$ is placed in series with $R^1$—$R^2$ and connected to $T^1$ by engagement of drum segments 24 and 26 with their respective contact fingers and by the disengagement of drum segment 25 from its contact finger. Terminal $T^4$ is disconnected by disengagement of drum segment 30 from its contact finger $FR^8$. The speed torque characteristic of the motor in the second lowering position is depicted by curve 2L in Fig. 10.

Referring to Fig. 5, it shows the primary connections established with the drum in its third lowering position, the change effected being that of including a third step of resistance $R^3$—$R^4$ in series between motor terminal $T^1$ and line $L^1$. The resistor $R^3$—$R^4$ is placed in series with resistors $R^1$—$R^2$ and $R^2$—$R^3$ and connected to terminal $T^1$ by the engagement of drum segments 24 and 27 with their respective contact fingers and the disengagement of drum segment 26 from its contact finger. The speed torque characteristics of the motor in the third lowering position is depicted by curve 3L in Fig. 10.

Referring to Fig. 6, it shows the primary connections established in the fourth and fifth lowering positions, the change effected being that of disconnecting terminal $T^1$ from line $L^1$ and connecting it in series with resistor $R^5$—$R^6$ to line $L^3$. Terminal $T^1$ is connected to line $L^3$ in series with resistor $R^5$—$R^6$ by disengagement of drum segments 24 and 27 from their respective contact fingers and by engagement of drum segments 20 and 21 with their respective contact fingers. The speed torque characteristics of the motor in the fourth lowering position is depicted by the curve 4L in Fig. 10.

The transition from the fourth to the fifth lowering position by inserting resistors $R^{11}$—$R^{12}$, $R^{21}$—$R^{22}$ and $R^{31}$—$R^{32}$ in series with the other resistors in the secondary circuit which further alters the speed torque characteristics of the motor is depicted by curve 5L of Fig. 10.

Multi voltage motor method

A multi voltage motor having at least two sections of windings in each phase of the motor primary can be used in lieu of a motor of the type described above, whereby the number of coil turns in one phase of the primary windings may be effectively reduced without the necessity of changing the internal wiring arrangement in one phase of the primary circuit. The control now to be described involves use of a standard multi voltage motor with variation of the number of coil turns in one phase of the primary circuit being accomplished by external commutation of the usual winding section terminals. It is recognized that changing of winding section connections in all of the phases of the primary circuit simultaneously is old in the art. However, it is here contemplated to maintain the same connections for the winding sections in each of the other phases of the motor primary in all lowering positions while altering the connections of the winding sections in one phase of the motor primary in certain lowering positions.

Referring to Figs. 7, 8 and 9, they show the motor primary circuits for first, intermediate, and second lowering positions, respectively, using a dual voltage type motor with two winding sections in each of the phases. For simplicity of illustration Figs. 7, 8 and 9 show only the primary 40 of such motor, the showing being diagrammatic. In each of two of the primary phase windings their respective sections are connected in series in all lowering positions, while in the first lowering position the sections of a third phase are connected in parallel and then are recommutated so as to be in series in the second to the fifth lowering positions. Connecting the sections of one phase in parallel in the first lowering position produces an increase in flux in that phase like that obtained by using a part winding tap as in the primary tap method above described.

The control now to be described assumes the use of a drum controller like Fig. 1, except for the addition of interconnected segments 35, 36 and 37, to engage respective contact fingers $FT^0$, $FT^5$ and $FT^4$, as hereinafter set forth, and segment 28 is extended to engage its finger in the first lowering position. The primary 40 has six terminals instead of four as in Fig. 1, the additional terminals being designated as $T^0$ and $T^5$. The following detailed discussion of the various motor primary connections shown in Figs. 7, 8 and 9 will make the functions and relation of these additional contact fingers and motor terminals readily apparent.

Referring to Fig. 7, it shows the motor primary connections in the first lowering position. Connection of motor terminals $T^1$ and $T^3$ is accomplished in the same way as discussed in connection with Fig. 2. Terminal $T^2$ is directly connected to line $L^2$ by engagement of drum segments 28 and 29 and their respective contact fingers $FT^2$ and $FL^2$. Motor terminal $T^4$ is also connected to line $L^2$ by the engagement of drum segment 31 with its respective contact finger. Segment 30 also engages its contact finger to complete circuit from $T^4$ to $L^2$ through resistor $R^7$—$R^8$, but in the first position said resistor is short-circuited, as will be apparent. Motor terminal $T^0$ is connected to motor terminal $T^5$ by engagement of drum segments 35 and 36 with their respective contact fingers. With this arrangement it will be seen that the winding section $T^2$—$T^5$ is connected in parallel with winding section $T^4$—$T^0$. The speed torque characteristics of the motor in the first lowering position with these connections of the motor primary will be substantially as depicted by curve 1L in Fig. 10.

Referring to Fig. 8, it shows the motor primary connections for the intermediate position between the first and second lowering positions. The connection of motor terminals $T^1$, $T^2$ and $T^3$ are the same as discussed in connection with Fig. 7. Drum contact 31 disengages its contact finger, thereby placing resistor $R^7$—$R^8$ in series between terminal $T^4$ and line $L^2$. Terminal $T^5$ is disconnected from terminal $T^0$ by the disengagement of drum segment 35 from its contact finger, and terminal $T^5$ is connected to terminal $T^4$ by engagement of drum segment 37 with its contact finger. Further movement of the drum controller through the intermediate position to the second lowering position disengages segment 30 from its contact finger, thereby disconnecting terminal $T^4$ from line $L^2$. Engagement of drum segment 37 prior to the disengagement of segment 30 insures that there will be a continuous circuit connection with the other phase windings in the transition. The inclusion of resistor $R^7$—$R^8$ between line $L^2$ and $T^4$ is necessary to prevent short-circuiting of the winding section $T^2$—$T^5$ during the overlap of contacts 30 and 37.

Referring to Fig. 9, it shows the motor primary connections in the second lowering position. Drum segment 25 disengages its contact finger, and drum segment 26 engages its contact finger, thereby including a second step of resistance $R^2$—$R^3$ in series with $R^1$—$R^2$ between line $L^1$ and terminal $T^1$, the connection of terminal $T^3$ remaining the same as shown in Figs. 7 and 8, and the connection of wire turn sections $T^4$—$T^0$ and $T^5$—$T^2$ remaining as established in the intermediate position. The speed torque characteristics for the second lowering position are depicted by curve 2L in Fig. 10.

The connections of the motor primary remain the same as in Fig. 9 for the third lowering position, with the exception that a third step of resistance $R^3$—$R^4$ is included in series with resistors $R^1$—$R^2$ and $R^2$—$R^3$ by disengaging drum segment 26 from its contact finger and engaging drum segment 27 with its contact finger, as explained in connection with Fig. 5. The speed torque characteristics of the motor for the third lowering position are depicted by curve 3L of Fig. 10.

Moving the controller from the third to the fourth lowering position disengages drum segments 24 and 27 from its respective contact fingers, thereby disconnecting terminal $T^1$ from line $L^1$ and drum segments 20 and 21 not shown in Fig. 9 but shown in Fig. 6 engage their respective contact fingers, thereby connecting the terminal $T^1$ in series with resistor $R^5$—$R^6$ to line $L^3$. The speed torque characteristic for the fourth lowering position is depicted by curve 4L of Fig. 10.

No change of the motor primary connections described for the fourth lowering position is made in moving the controller from the fourth to the fifth lowering position. However, resistors $R^{11}$—$R^{12}$, $R^{21}$—$R^{22}$ and $R^{31}$—$R^{32}$ are placed in series with the other resistors in the secondary circuit by disengagement of drum contact fingers 32, 33 and 34 from their respective contact fingers. The speed torque characteristics for the fifth lowering position are depicted by curve 5L in Fig. 10.

What we claim as new and desire to secure by Letters Patent is:

1. The method of controlling a polyphase alternating current motor under overhauling load conditions which consists in supplying single phase alternating current to the several phases of the motor primary and selectively establishing within the motor different coil circuits for one phase of its primary, thereby to obtain selectively under overhauling load conditions different speed torque characteristics which for maximum braking action provides increased torque for given speeds throughout a wide range.

2. The method of controlling a polyphase alternating current motor under overhauling load conditions which consists in supplying single phase alternating current to the several phases of the motor primary and selectively varying the effective number of coil turns in one phase of the primary thereby to obtain selectively under overhauling load conditions different speed torque characteristics which for maximum braking action provide increased torque for given speeds throughout a wide range.

3. The method of controlling a polyphase multi-voltage alternating current motor under overhauling load conditions which consists in supplying single phase alternating current to the several phases of the motor primary, and selectively establishing series or parallel connections for winding sections in one phase of the motor primary to obtain selectively, under overhauling load conditions, different speed torque characteristics which for maximum braking action provide increased torque for given speeds throughout a wide range.

4. In combination, a polyphase alternating current motor having for the coils in one phase of the motor primary variable connections and external terminals through the medium of which said connections may be subjected to certain changes, to vary the effective turns in said one phase for variation of the magnetic flux of the motor, a polyphase alternating current supply circuit, and means to connect the primary of said motor to said supply circuit and under overhauling load conditions to establish line connections for single phase supply of said motor primary which connections in respect of said terminals of said one phase of the motor primary are such as to effect increase of the magnetic flux of the motor for greater braking effect on the overhauling load.

5. In combination, a polyphase alternating current motor having an intermediately tapped winding in one phase of its primary and having external terminals, including a terminal for the tap of said winding, through the medium of which the effective number of coil turns in said winding may be subjected to change to vary the magnetic flux of the motor, a polyphase alternating current supply circuit, and means to connect the primary of said motor to said supply circuit, and under overhauling load conditions to establish line connections for single phase supply of said motor primary which connections with respect to the terminals in said one phase are such as to effect increase of the magnetic flux of the motor for greater braking effect on the overhauling load.

6. In combination, a polyphase multi voltage alternating current motor having separate sets of terminals for each winding section in each phase, through the medium of which the interconnections of the winding sections may be varied, to vary the magnetic flux of the motor, a polyphase alternating current supply circuit, and means to connect the primary of said motor to said supply circuit, and under overhauling load conditions to establish line connections for single phase supply of said motor primary which connections with respect to the terminals of the motor primary are such as to effect increase of the magnetic flux of the motor for greater braking effect on the overhauling load.

7. In combination, a polyphase multi voltage alternating current motor having separate sets of terminals for each winding section in each phase of the motor primary, through the medium of which the winding sections in each phase may be connected in either series or parallel relation, a polyphase alternating current supply circuit, and means to connect to said circuit all phases of the motor primary and under overhauling load conditions to establish line connections for single phase supply of the motor primary which connections are such as to establish parallel relationship of the winding sections in one phase while maintaining series relationship of the winding sections in each of the other phases to increase the magnetic flux of the motor for greater braking effect on the overhauling load.

8. The method of controlling a polyphase alternating current motor under overhauling load conditions which comprises the step of supplying single phase alternating current to the several phases of the motor primary while effecting unbalance with respect to the windings of said several phases of the motor primary to obtain increased torque for given speeds throughout a wide range.

9. In combination, a polyphase alternating current motor having for the coils in one phase of the motor primary variable connections and external terminals through the medium of which said connections may be subjected to certain changes to vary the effective turns in said one phase for variation of the magnetic flux of the motor, a resistor, a polyphase alternating current supply circuit, and means to connect the primary of said motor to said supply circuit and under overhauling load conditions to establish line connections for single phase supply of said motor primary which connections in respect of said terminals of said one phase of the motor primary are such as to effect increase of the magnetic flux of the motor and which connections are such as to include said resistor in series in another phase of said motor primary.

10. In combination, a polyphase alternating current motor having an intermediately tapped winding in one phase of its motor primary and having external terminals including a terminal for the tap of said winding through the medium of which the effective number of coil turns in said winding may be subjected to change to vary the magnetic flux of the motor, a resistor, a polyphase alternating current supply circuit, and means to connect the motor primary windings to said supply circuit for single phase supply of said windings, said means providing for connection of the tapped winding through its tap or through an end terminal selectively and in changing from said tap to said end terminal, first inserting said resistor in the connection to said tap while at the same time establishing line connection of said end terminal and then interrupting the connection to said tap.

11. In combination, a polyphase multi-voltage alternating current motor having separate sets of terminals for each winding section in each phase of the motor primary, through the medium of which the winding sections in each phase may be connected in either series or parallel relation, a resistor, a polyphase alternating current supply circuit, and means to connect to said supply circuit all phases of the motor primary for single phase supply thereof, said means providing for connection of the winding sections in one phase of the motor primary in parallel or series relation selectively and in changing them from parallel to series relation, first inserting said resistor in the connection to one terminal of the last mentioned winding sections, at the same time shifting to said one terminal from the opposite terminal of said last mentioned winding section its interconnection with the other of the last mentioned winding sections and then interrupting said connection through said resistor to said last mentioned winding sections.

EDWIN W. SEEGER.
NORBERT L. SCHMITZ.

REFERENCES CITED

The following references are of record in the file of this patent:

UNITED STATES PATENTS

| Number | Name | Date |
|---|---|---|
| 1,123,321 | Lamme | Jan. 5, 1915 |